US00RE37307E

(19) United States

(12) Reissued Patent

Bahar et al.

(10) Patent Number: US RE37,307 E

(45) Date of Reissued Patent: Aug. 7, 2001

(54) ULTRA-THIN INTEGRAL COMPOSITE MEMBRANE

(75) Inventors: Bamdad A. Bahar, Elkton, MD (US); Robert S. Mallouk, Chadds Ford, PA (US); Alex R. Hobson, Elkton; Jeffrey A. Kolde, Baltimore, both of MD (US)

(73) Assignee: W. L. Gore & Associates, Inc., Newark, DE (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/137,515

(22) Filed: Aug. 20, 1998

Related U.S. Patent Documents

Reissue of:

(64) Patent No.: 5,547,551
Issued: Aug. 20, 1996
Appl. No.: 08/404,853
Filed: Mar. 15, 1995

(63) Continuation-in-part of application No. 08/339,425, filed on Nov. 14, 1994, now abandoned.

(51) Int. Cl.[7] ..... C25B 13/08

(52) U.S. Cl. ..... 204/296; 521/27; 429/33; 210/500.36; 210/500.1; 204/632

(58) Field of Search ..... 204/296, 632; 521/27; 429/33, 30; 210/500.36, 500.1

(56) References Cited

U.S. PATENT DOCUMENTS

| | | | |
|---|---|---|---|
| 2,681,319 | 6/1954 | Bodamer | 260/2.1 |
| 2,827,426 | 3/1958 | Bodamer | 204/98 |
| 2,951,818 | 9/1960 | Hagen | 260/21 |
| 2,965,697 | 12/1960 | Duddy | 136/146 |
| 3,692,569 | 9/1972 | Grot et al. | 117/138.845 |
| 3,953,566 | 4/1976 | Gore | 264/285 |
| 4,012,303 | 3/1977 | D'Agostino et al. | 204/159.17 |
| 4,065,534 | 12/1977 | Rechlicz et al. | 264/91 |
| 4,186,076 | 1/1980 | de Nora et al. | 204/295 |
| 4,207,163 | 6/1980 | Kadija | 204/253 |
| 4,207,164 | 6/1980 | Kadia | 204/253 |
| 4,210,510 | 7/1980 | Grimes | 204/19 D |
| 4,218,542 | 8/1980 | Ukihashi et al. | 521/27 |
| 4,224,121 | 9/1980 | Dempsey et al | 204/90 |
| 4,255,523 | 3/1981 | Ukihashi et al. | 521/27 |
| 4,262,041 | 4/1981 | Eguchi et al. | 427/245 |
| 4,311,567 | 1/1982 | White | 204/98 |
| 4,313,832 | 2/1982 | Shimizu et al. | 210/663 |
| 4,341,615 | 7/1982 | Bachot et al. | 204/296 |
| 4,433,082 | 2/1984 | Grot | 524/755 |
| 4,453,991 | 6/1984 | Grot | 56/94 |
| 4,469,744 | 9/1984 | Grot et al. | 428/246 |
| 4,518,650 | 5/1985 | Grot et al. | 428/286 |
| 4,528,083 | 7/1985 | LaConti et al. | 204/265 |
| 4,604,170 | 8/1986 | Miyake et al. | 204/98 |
| 4,629,563 | 12/1986 | Wrasidlo | 210/500.34 |
| 4,664,801 | 5/1987 | Thomas | 210/489 |
| 4,698,243 | 10/1987 | Carl et al. | 427/341 |
| 4,774,039 | 9/1988 | Wrasidlo | 264/41 |
| 4,804,592 | 2/1989 | Vanderborgh et al. | 429/33 |
| 4,849,311 | 7/1989 | Itoh | 429/192 |
| 4,863,604 | 9/1989 | Lo et al. | 210/490 |
| 4,865,925 | 9/1989 | Ludwig et al. | 429/12 |
| 4,865,930 | 2/1980 | Gore | 429/192 |
| 4,902,308 | 2/1990 | Mallouk et al. | 55/16 |
| 4,931,168 | 6/1990 | Wantanabe et al. | 204/284 |
| 4,954,388 | 9/1990 | Mallouk et al. | 428/198 |
| 4,985,296 | 1/1991 | Mortimer, Jr. | 428/220 |
| 4,990,228 | 2/1991 | Perusich et al. | 204/98 |
| 4,997,567 | 3/1991 | Messalem et al. | 210/490 |
| 5,041,195 | 8/1991 | Taylor et al. | 204/96 |
| 5,066,403 | 11/1991 | Dutta et al. | 210/638 |
| 5,075,006 | 12/1991 | Schucker | 210/500.27 |

(List continued on next page.)

FOREIGN PATENT DOCUMENTS

| | | | |
|---|---|---|---|
| 0 594 007 A1 | | 4/1994 | (EP) . |
| 2 052 382 | | 1/1981 | (GB) . |
| 2 091 166 | | 7/1982 | (GB) . |
| 2 097 788 | | 11/1982 | (GB) . |
| 49-146570 | * | 12/1974 | (JP) . |
| 51-71888 | | 6/1976 | (JP) . |
| 57-134586 | | 8/1982 | (JP) . |
| 60-84590 | | 5/1985 | (JP) . |
| 61-276987 | | 12/1986 | (JP) . |
| 62-240627 | | 9/1987 | (JP) . |
| 62-280230 | | 12/1987 | (JP) . |
| 63-11979 | | 1/1988 | (JP) . |
| 6-29032 | | 2/1994 | (JP) . |
| 89/06055 | | 6/1989 | (WO) . |
| 91/14021 | | 3/1990 | (WO) . |
| 95/16730 | * | 6/1995 | (WO) . |

OTHER PUBLICATIONS

"Composite Membranes for Fuel–Cell Applications," Mark W. Verbrugge et al., AICHE Journal, Jan. 1992, vol. 38, No. 1, pp. 93–100.

Literature: Reginal M. Penner and Charles R. Martin, Ion Transporting Composite Membranes, Journal Electrodhem Soc. vol. 132, No. 2, Feb. 1985, pp. 514–515.

AIChE Journal, vol. 38, No. 1, Jan., 1992, pp. 93–100, Mark W. Verbrugge et al. "Composite Membranes for Fuel–Cell Applications".

Journal Electrochem Soc., vol. 137, No. 2—Ion Transporting composite Membranes, Feb. 1990 pp. 510–515 (C. Liu et al.).

Journal Electrochem Soc., vol. 132, No. 2—Son Transporting Composite Membranes, Feb. 1985, pp. 514–515.*

* cited by examiner

*Primary Examiner*—Kathryn Gorgos

(74) *Attorney, Agent, or Firm*—Morgan & Finnegan, LLP

(57) ABSTRACT

An ultra-thin composite membrane is provided which includes a base material and an ion exchange resin. The base material is a membrane which is defined by a thickness of less than [1 mil (0.025 mm)] *0.8 mils* and a microstructure characterized by node interconnected by fibrils, or a microstructure characterized by fibrils with no nodes present. The ion exchange resin substantially impregnates the membrane such that the membrane is essentially air impermeable.

49 Claims, 3 Drawing Sheets

U.S. PATENT DOCUMENTS 5,082,472 * 1/1992 Mallouk et al. ..... 55/16
5,094,895 3/1992 Branca et al. ..... 428/36.91
5,124,018 6/1992 Furuya et al. ..... 204/284
5,133,842 7/1992 Taylor et al. ..... 204/98
5,154,827 10/1992 Ashelin et al. ..... 210/490
5,183,545 2/1993 Branca et al. ..... 204/252
5,183,713 2/1993 Kunz ..... 429/44
5,186,877 2/1993 Watanabe ..... 264/104
5,190,813 3/1993 Ohashi et al. ..... 428/319.3
5,209,850 5/1993 Abayasekara et al. ..... 210/500.36
5,234,777 8/1993 Wilson ..... 429/33
5,256,503 10/1993 Cook et al. ..... 429/249
5,275,725 1/1994 Ishii et al. ..... 210/321.67
5,288,384 2/1994 Banerjee ..... 204/252
5,336,384 8/1994 Tsou et al. ..... 204/252
5,350,643 9/1994 Imahashi et al. ..... 429/33
5,356,663 10/1994 Perusich et al. ..... 427/140
5,415,888 5/1995 Banerjee et al. ..... 427/125
5,447,636 9/1995 Banerjee ..... 210/638
5,521,023 5/1996 Kejha et al. ..... 429/142
5,545,475 8/1996 Korleski ..... 428/306.6
5,672,438 * 9/1997 Banerjee et al. ..... 429/33

ULTRA-THIN INTEGRAL COMPOSITE MEMBRANE

Matter enclosed in heavy brackets [ ] appears in the original patent but forms no part of this reissue specification; matter printed in italics indicates the additions made by reissue.

*This is a continuation-in-part of Ser. No. 08/339,425 filed Nov. 14, 1994 now abandoned.*

FIELD OF THE INVENTION

An integral composite membrane having a thickness of less than about 1 mil (0.025 mm) is provided which is useful in electrolytic processes and other chemical separations.

BACKGROUND OF THE INVENTION

Ion exchange membranes (IEM) are used in fuel cells as solid electrolytes. A membrane is located between the cathode and anode and transports protons formed near the catalyst at the hydrogen electrode to the oxygen electrode thereby allowing a current to be drawn from the cell. These polymer electrolyte fuel cells are particularly advantageous because they operate at lower temperatures than other fuel cells. Also, these polymer electrolyte fuel cells do not contain any corrosive acids which are found in phosphoric acid fuel cells.

Ion exchange membranes are also used in chloralkali applications to separate brine mixtures to form chlorine gas and sodium hydroxide. The membrane selectively transports the sodium ions across the membrane while rejecting the chloride ions. Additionally, IEMs are useful in the areas of diffusion dialysis, electrodialysis and for pervaporation and vapor permeation separations.

In electrodialysis, electrolytes can be divided into a concentrated and a diluted stream. This is accomplished by arraying anionic and cationic exchange membranes in a filter press arrangement. Alternating compartments between the membranes are filled with either the feed stream or the product stream. An electric field is applied across this series array by inserting electrodes in the end compartments. At the positive electrode, oxygen is produced, as well as hydrogen ions. At the negative electrode, hydrogen is evolved as well as hydroxide ions.

In diffusion dialysis, a stream of contaminated acid or base can be separated from dissolved metal ions, colloidal or non-ionic species. The acid or base can than be returned to the original process. A diffusion dialysis system consists of a filter press type arrangement with anion or cation exchange membranes between compartments of that system. Alternate compartments are filled with either the waste material or water. The desired ions diffuse through the membrane. The undesired ions are rejected and removed as waste.

The IEMs must have sufficient strength to be useful in their various applications. Often this need for increased strength requires the membranes to be made thicker which decreases their ionic conductivity. For example, IEMs that are not reinforced (such as those commercially available from E. I. DuPont de Nemours, Inc., and sold under the registered trademark Nation®) are inherently weak, and must be reinforced at small thicknesses (e.g., less than 0.050 mm) with additional materials causing the final product to have increased thickness.

U.S. Pat. No. 3,692,569 to Grot relates to the use of a coating of a copolymer of fluorinated ethylene and a sulfonyl-containing fluorinated vinyl monomer on a fluorocarbon polymer that was previously non-wettable. The fluorocarbon polymer may include tetrafluoroethylene polymers. This coating provides a topical treatment to the surface so as to decrease the surface tension of the fluorocarbon polymer. U.S. Pat. No. 4,453,991 to Grot relates to a process for making a liquid composition of a perfluorinated polymer having sulfonic acid or sulfonate groups in a liquid medium that is contacted with a mixture of water and a second liquid, such as a low molecular weight alcohol. The liquid made by the process may be used as a coating, a cast film, or as a repair for perfluorinated ion exchange films and membranes.

U.S. Pat. No. 4,453,991 to Grot relates to a process for making articles coated with a liquid composition of a perfuorinated polymer having sulfonic acid or sulfonate groups in a liquid medium by contacting the polymer with a mixture of 25 to 100% by weight of water and 0 to 75% by weight of a second liquid component, such as a low molecular weight alcohol, in a closed system.

U.S. Pat. No. 4,469,744 to Grot et al. relates to a protective clothing of fabric containing a layer of highly fluorinated ion exchange polymer. Example 1 refers to a microporous polytetrafluoroethylene (PTFE) film having a thickness of 127 micrometers as described by U.S. Pat. No. 3,962,153. Solution is applied with the use of a vacuum. The film was then placed in an oven (under vacuum) at 120° C. for 5 hours. The final product had a thickness of about 127 micrometers (5 mils) and required the use of a vacuum to provide for any impregnation.

U.S. Pat. No. 4,902,308 to Mallouk, et al. relates to a film of porous expanded PTFE having its surfaces, both exterior and internal, coated with a metal salt of perfluoro-cation exchange polymer. The base film of porous, expanded PTFE (ePTFE) had a thickness of between 1 mil and 6 mils (0.025–0.150 mm). The final composite product had a thickness of at least 1 mil (0.025 mm) and preferably had a thickness of between 1.7 and 3 mils (0.043–0.075 mm). The composite product was permeable to air and the air flow, as measured by the Gurley densometer ASTM D726-58, was found to be between 12 and 22 seconds.

U.S. Pat. No. 4,954,388 to Mallouk, et al. relates to an abrasion-resistant, tear resistant, multi-layer composite membrane having a film of continuous ion exchange polymer attached to a reinforcing fabric by means of an interlayer of porous expanded PTFE. A coating of a ion exchange resin was present on at least a portion of the internal and external surfaces of the fabric and porous ePTFE. The composite membrane made in accordance with the teachings of this patent resulted in thicknesses of greater than 1 mil (0.025 mm) even when the interlayer of porous ePTFE had a thickness of less than 1 mil (0.025 mm).

U.S. Pat. No. 5,082,472 to Mallouk, et al. relates to a composite membrane of microporous film in laminar contact with a continuous ion exchange resin layer wherein both layers have similar area dimensions. Surfaces of internal nodes and fibrils of ePTFE may be coated at least in part with ion exchange resin coating. The membrane of ePTFE had a thickness of about 2 mils (0.050 mm) or less and the ion exchange layer in its original state had a thickness of about 1 mil (0.025 mm). The ePTFE layer of this composite membrane imparted mechanical strength to the composite structure and the interior of the ePTFE was preferably essentially untilled so as to not block the flow of fluids.

U.S. Pat. Nos. 5,094,895 and 5,183,545 to Branca, et al. relate to a composite porous liquid-permeable article having multiple layers of porous ePTFE bonded together and having interior and exterior surfaces coated with an ion exchange polymer. This composite porous article is particularly useful as a diaphragm in electrolytic cells. The composite articles are described to be relatively thick, preferably between from 0.76 and 5 mm.

U.S. Pat. No. 4,341,615 to Bachot, et al. relates to a fluorinated resin base material treated with a copolymer of an unsaturated carboxylic acid and a non-ionic unsaturated monomer for use as a porous diaphragm in the electrolysis of alkaline metal chlorides. The fluorinated resin base material may be reinforced with fibers, such as asbestos, glass, quartz, zirconia, carbon, polypropylene, polyethylene, and fluorinated polyhalovinylidene (col. 2, lines 13–17). Only 0.1 to 6 percent of the total pore volume of the support sheet is occupied by the carboxylic copolymer.

U.S. Pat. No. 4,604,170 to Miyake et al. relates to a multi-layered diaphragm for electrolysis comprising a porous layer of a fluorine-containing polymer, having a thickness of from 0.03 to 0.4 mm with its interior and anode-side surface being hydrophilic and an ion exchange layer on its cathode surface. The ion exchange layer is thinner than the porous layer, with a thickness of at least 0.005 mm, and the total thickness of the diaphragm is from 0.035 to 0.50 mm.

U.S. Pat. No. 4,865,925 to Ludwig, et al. relates to a gas permeable electrode for electrochemical systems. The electrode includes a membrane located between, and in contact with, an anode and a cathode. The membrane, which may be made of expanded polytetrafluoroethylene, may be treated with an ion exchange membrane material with the resulting membrane maintaining its permeability to gas. Membrane thicknesses are described to be between 1 and 10 mils, (0.025–0.25 mm), with thicknesses of less than 5 mils (0.125) to be desirable. Examples show that membrane thicknesses range from 15 to 21 mils.

Japanese Patent Application No. 62-240627 relates to a coated or an impregnated membrane formed with a perfluoro type ion exchange resin and porous PTFE film to form an integral unit. The resulting composite is not fully occlusive. Furthermore, the teachings of this patent do not provide for permanent adhesion of the ion exchange resin to the inside surface of the PTFE film. The weight ratio of the ion exchange resin to PTFE is described to be in the range of 3 to 90% with a preferable weight ratio of 10 to 30%.

Japanese Application Nos. 62-280230 and 62-280231 relate to a composite structure in which a scrim or open fabric is heat laminated and encapsulated between a continuous ion exchange membrane and an ePTFE sheet thus imparting tear strength to the structure.

Additional research has also been conducted on the use of perfluorosulfonic acid polymers with membranes of expanded porous polytetrafluoroethylene such as that described in Journal Electrochem. Soc., Vol. 132, No. 2, February 1985, p. 514–515. The ion exchange material was in an ethanol based solvent without the presence of water or surfactant. Moreover, ultrasonic energy was used in the treatment of this membrane.

A paper titled "Ion Transporting Composite Membrane", by Lui & Martin, (Journal Electrochemical Society, Vol., 137, No. 2, February 1990) describes doping a microporous host material with an ion exchange polymer for the purposes of electrocatalysis.

None of the above described materials adequately addresses the current and anticipated demands for an ion exchange membrane. There remains a distinct need for a strong, ultra-thin, integral composite ion exchange membrane, having long term chemical and mechanical stability, very high ionic conductance, and having a thickness, before swelling, of less than 1 mil (0.025 mm). Because the present invention is thinner than the membranes of prior art, the ionic conductance is substantially higher than with any other ion exchange membranes.

SUMMARY OF THE INVENTION

The present invention is a distinct advancement over presently known inn exchange membranes, and the techniques for making such membranes. In one embodiment of the present invention, this is accomplished by providing an ultra-thin integral composite membrane comprised of an expanded polytetrafluoroethylene having a porous microstructure defined by nodes interconnected by fibrils. The total thickness of the membrane is less than 0.025 mm. An ion exchange material is impregnated throughout such that the membrane is essentially air impermeable. The ion exchange material may be selected from a group consisting of perfluorinated sulfonic acid resin, perfluorinated carboxylic acid resin, polyvinyl alcohol, divinyl benzene, styrene-based polymers, and metal salts with or without a polymer. The membrane may be bonded to a reinforcement backing of a woven or nonwoven material.

In another embodiment of the present invention, an ion exchange membrane comprises an expanded polytetrafluoroethylene having a porous microstructure defined substantially of fibrils with no nodes present. The porous microstructure of such a membrane defines pores having an average size of from about 0.05 to about 0.4 $\mu$m. The total thickness of this membrane is less than 13 $\mu$m. An ion exchange material is impregnated throughout the membrane such that the membrane is essentially air impermeable. The ion exchange material may be of the type described hereinabove.

Preferably, a method for making an ion exchange membrane of the present invention is provided which comprises the following steps:

(a) providing a membrane having a porous microstructure and a total thickness of less than 0.025 mm;

(b) providing an ion exchange material;

(c) impregnating the membrane with the exchange material so as to render the membrane essentially air impermeable; and (d) heating said impregnated membrane to an elevated temperature above 60° C. for a predetermined period of time.

The foregoing and other aspects will become apparent from the following detailed description of the invention when considered in conjunction with the accompanying drawing figures.

DETAILED DESCRIPTION OF THE INVENTION

Figure 1:
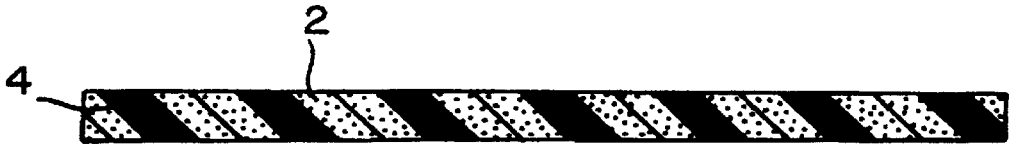
FIG. 1 is a schematic cross-section of a composite membrane of the present invention that is fully impregnated with an ion exchange material.
Figure 5:
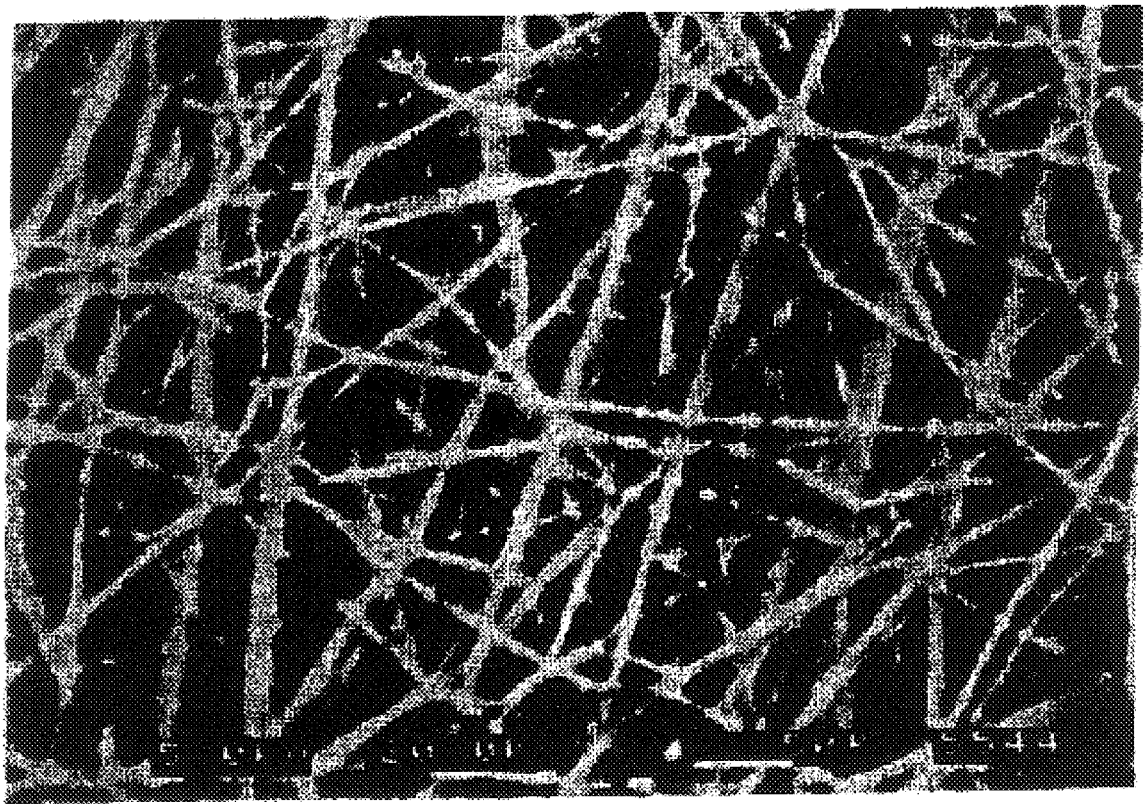
FIG. 5 is a photomicrograph, at a magnification of 20.0k×, of a cross-section of an expanded PTFE membrane, comprised substantially of fibrils with no nodes present, which has not been treated with an ion exchange material.

As best illustrated by FIG. 1, an ultra-thin composite membrane is provided which includes a base material 4 and an ion exchange material or ion exchange resin 2. The base material 4 is a membrane which is defined by a thickness of less than 1 mil (0.025 mm) and a porous microstructure characterized by nodes interconnected by fibrils (FIG. 3) or a porous microstructure characterized substantially by fibrils (FIG. 5). The ion exchange resin substantially impregnates the membrane so as to render the interior volume substantially occlusive. For instance, by filling greater than 90% of the interior volume of the membrane with ion exchange resin sufficient occlusion will occur. The ion exchange resin is securely adhered to both the external and internal membrane surfaces, i.e. the fibrils and/or nodes of the base material.

The ultra-thin composite membrane of the present invention may be employed in various applications, including but not limited to polarity-based chemical separations, electrolysis, fuel cells and batteries, pervaporation, gas separation, dialysis separation, industrial electrochemistry such as chloralkali production and other electrochemical applications, use as a super acid catalyst, or use as a medium in enzyme immobilization, for example.

The ultra-thin composite membrane of the present invention is uniform and mechanically strong. As used herein, "ultra-thin" is defined as less than 1 mil (0.025 mm); and "uniform" is defined as continuous impregnation with the ion exchange material such that no pin holes or other discontinuities exist within the composite structure. The membrane should be "occlusive", meaning that the interior volume of the porous membrane is impregnated such that the interior volume is filled with the ion exchange material and the final membrane is essentially air impermeable having a Gurley number of greater than 10,000 seconds. A fill of 90% or more of the interior volume of the membrane should provide adequate occlusion for purposes of the present invention.

Figure 3:
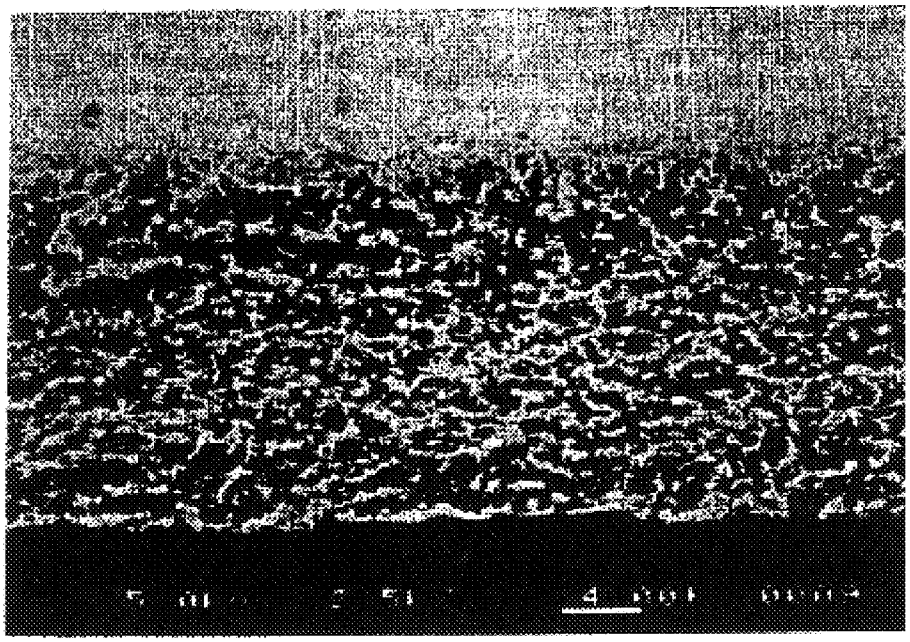
FIG. 3 is a photomicrograph, at a magnification of 2.5k×, of a cross-section of an expanded PTFE membrane that has not been treated with an ion exchange material.

A preferred base material 4 is an expanded polytetrafluoroethylene (ePTFE) made in accordance with the teachings of U.S. Pat. No. 3,593,566, incorporated herein by reference. Such a base material has a porosity of greater than 35%. Preferably, the porosity is between 70–95%. The thickness of the membrane is less than 1 mil (0.025 mm). Preferably, the thickness is between 0.06 mils (0.19 $\mu$m) and 0.8 mils (0.02 $\mu$m), and most preferably, the thickness is between 0.50 mils (0.013 mm) and 0.75 mils (0.019 mm). This material is commercially available in a variety of forms from W. L. Gore & Associates, Inc., of Elkton, Md., under the trademark GORE-TEX®. FIG. 3 shows a photomicrograph of the internal porous microstructure of this expanded PTFE. As seen therein, the porous microstructure comprises nodes interconnected by fibrils which define an interior volume of the base material 4. Alternatively, the base material 4 may comprise an ePTFE material having a porous microstructure defined substantially of fibrils with no nodes present. Such a base material 4 may be referred to as a nonwoven web.

To manufacture the ePTFE nonwoven web, a PTFE that has a low amorphous content and a degree of crystallization of at least 98% is used as the raw material. More particularly, a coagulated dispersion or fine powder PTFE may be employed, such as but not limited to Fluon® CD-123 and Fluon® CD-1 available from ICI Americas, Inc., or TEFLON® fine powders available from E. I. DuPont de Nemours and Co., Inc. (TEFLON is a registered trademark of E. I. DuPont de Nemours and Co., Inc.) These coagulated dispersion powders are lubricated with a hydrocarbon extrusion aid, preferably an odorless mineral spirit, such as ISOPAR K (made by Exxon Corp.) (ISOPAR is a registered trademark of the Exxon Corporation). The lubricated powder is compressed into cylinders and extruded in a ram extruder to form a tape. The tape is compressed between rolls to an appropriate thickness, usually 5 to 10 mils. The wet tape is stretched traversely to 1.5 to 5 times its original width. The extrusion aid is driven off with heat. The dried tape is then expanded longitudinally between banks of rolls in a space heated to a temperature that is below the polymer melting point (approximately 327° C.). The longitudinal expansion is such that the ratio of speed of the second bank of rolls to the first bank is from about 10–100 to 1. The longitudinal expansion is repeated at about 1–1.5 to 1 ratio.

After the longitudinal expansion, the tape is expanded traversely, at a temperature that is less than about 327° C., to at least 1.5 times, and preferably to 6 to 15 times, the width of the original extrudate, while restraining the membrane from longitudinal contraction. While still under constraint, the membrane is preferably heated to above the polymer melting point (approximately 342° C.) and then cooled. This nonwoven web is characterized by the following:

(a) average pore size between 0.05 and 0.4 micrometers, and preferably less than 0.2;

(b) a bubble point between 10 and 60 psi;

(c) a pore size distribution value between 1.05 and 1.20;

(d) a ball burst strength between 0.9 and 17 pounds/force;

(e) an air flow of between 20 Frazier and 10 Gurley seconds;

(f) a thickness between 1.32 $\mu$m and 25.4 $\mu$m; and (g) a fiber diameter of between 5 and 20 Nm.

Suitable ion exchange materials 2 include, but are not limited to, perfluorinated sulfonic acid resin, perfluorinated carboxylic acid resin, polyvinyl alcohol, divinyl benzene, styrene-based polymers and metal salts with or without a polymer. A mixture of these ion exchange materials may also be employed in treating the membrane 4. Solvents that are suitable for use with the ion exchange material, include for example, alcohols, carbonates, THF (tetrahydrofuran), water, and combinations thereof.

A surfactant having a molecular weight of greater than 100 is preferably employed with the ion exchange material 2 to ensure impregnation of the interior volume of the base material 4. Surfactants or surface active agents having a hydrophobic portion and a hydrophilic portion may be utilized. Preferable surfactants are those having a molecular weight of greater than 100 and may be classified as anionic, nonionic, or amphoteric which may be hydrocarbon or fluorocarbon-based and include for example, Merpol®, a hydrocarbon based surfactant or Zonyl®, a fluorocarbon based surfactant, both commercially available from E. I. DuPont de Nemours, Inc. of Wilmington, Del.

A most preferred surfactant is a nonionic material, octylphenoxy polyethoxyethanol having a chemical structure:

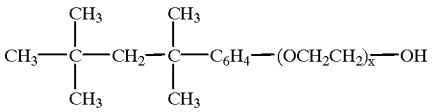

where x=10 (average)
known as Triton X-100, commercially available from Rohm & Haas of Philadelphia, Pa.

Figure 4:
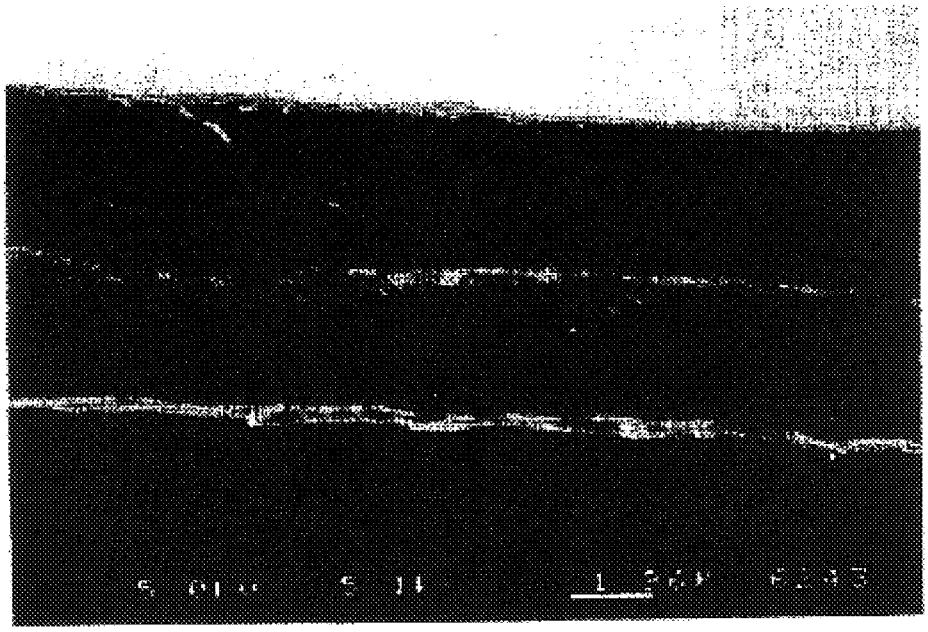
FIG. 4 is a photomicrograph, at a magnification of 5.1k×, of a cross-section of an expanded PTFE membrane impregnated with an ion exchange material such that the interior volume of the membrane is substantially occluded.

As best seen by reference to FIG. 4, the final composite membrane of the present invention has a uniform thickness free of any discontinuities or pinholes on the surface. The interior volume of the membrane is occluded such that the composite membrane is impermeable to non-polar gases and to bulk flow of liquids.

Figure 2:
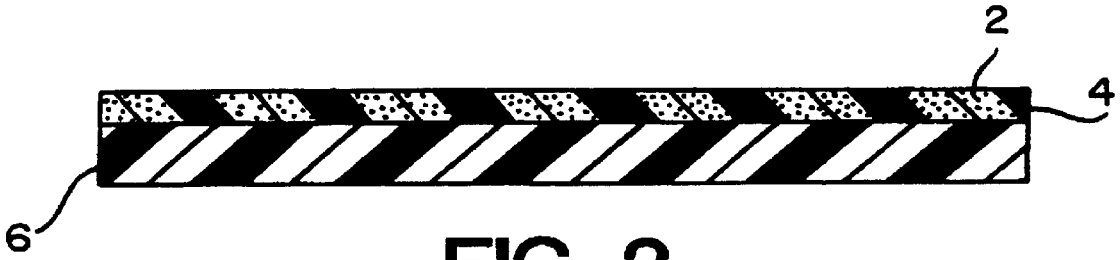
FIG. 2 is a schematic cross-section of the composite membrane of the present invention that is fully impregnated with an ion exchange material and including a backing material attached thereto.

Optionally, and as shown schematically in FIG. 2, the composite membrane may be reinforced with a woven or non-woven material 6 bonded to one side of the base material 4. Suitable woven materials may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, from Tetko Inc., of Briarcliff Manor, N.Y. Suitable non-woven materials may include, for example, a spun-bonded polypropylene from Reemay Inc. of Old Hickory, Tenn.

The treated membrane may be further processed to remove any surfactant which may have been employed in processing the base material as described in detail herein. This is accomplished by soaking or submerging the membrane in a solution of, for example, water, isopropyl alcohol, hydrogen peroxide, methanol, and/or glycerin. During this step, the surfactant, which was originally mixed in solution with the ion exchange material, is removed. This soaking or submerging causes a slight swelling of the membrane, however the ion exchange material remains within the interior volume of the base material 4.

The membrane is further treated by boiling in a suitable swelling agent, preferably water, causing the membrane to slightly swell in the x and y direction. Additional swelling occurs in the z-direction. A composite membrane results having a higher ion transport rate that is also strong. The swollen membrane retains its mechanical integrity and dimensional stability unlike the membranes consisting only of the ion exchange material and simultaneously maintains desired ionic transport characteristics. A correlation exists between the content of the swelling agent within the membrane structure and transport properties of the membrane. A swollen membrane will transport chemical species faster than an unswollen membrane.

Although the membrane has excellent long term chemical stability, it can be susceptible to poisoning by organics. Accordingly, it is often desirable to remove such organics from the membrane. For example, organics can be removed by regeneration in which the membrane is boiled in a strong acid such as nitric or chromic acid.

To prepare the ultra-thin integral composite membrane of the present invention, a support structure, such as a polypropylene woven fabric, may first be laminated to the untreated base material 4 by any conventional technique, such as, hot roll lamination, ultrasonic lamination, adhesive lamination, or forced hot air lamination so long as the technique does not damage the integrity of the base material. A solution is prepared containing an ion exchange material in solvent mixed with one or more surfactants. The solution may be applied to the base material 4 by any conventional coating technique including forwarding roll coating, reverse roll coating, gravure coating, doctor coating, kiss coating, as well as dipping, brushing, painting, and spraying so long as the liquid solution is able to penetrate the interstices and interior volume of the base material. Excess solution from the surface of the membrane may be removed. The treated membrane is then immediately placed into an oven to dry. Oven temperatures may range from 60°–200° C., but preferably 120°–160° C. Drying the treated membrane in the oven causes the ion exchange resin to become securely adhered to both the external and internal membrane surfaces, i.e., the fibrils and/or nodes of the base material. Additional solution application steps, and subsequent drying, may be repeated until the membrane becomes completely transparent. Typically, between 2 to 8 treatments are required, but the actual number of treatments is dependent on the surfactant concentration and thickness of the membrane. If the membrane is prepared without a support structure, both sides of the membrane may be treated simultaneously thereby reducing the number of treatments required.

The oven treated membrane is then soaked in a solvent, such as the type described hereinabove, to remove the surfactant. Thereafter, the membrane is boiled in a swelling agent and under a pressure ranging from about 1 to about 20 atmospheres absolute thereby increasing the amount of swelling agent the treated membrane is capable of holding.

Alternatively, the ion exchange material may be applied to the membrane without the use of a surfactant. This procedure requires additional treatment with the ion exchange resin. However, this procedure does not require that the oven treated membrane be soaked in a solvent, thereby reducing the total number of process steps. A vacuum may also be used to draw the ion exchange material into the membrane. Treatment without surfactant is made easier if the water content of the solution is lowered. Partial solution dewatering is accomplished by slow partial evaporation of the ion exchange material solution at room temperature followed by the addition of a non-aqueous solvent. Ideally, a fully dewatered solution can be used. This is accomplished in several steps. First, the ion exchange material is completely dried at room temperature. The resulting resin is ground to a fine powder. Finally, this powder is redissolved in a solvent, preferably a combination of methanol and isopropanol.

Because the composite membrane of the present invention is ultra-thin, it is possible to selectively transport ions at a faster rate than previously has been achieved, with only a slight lowering of the selectivity characteristics of the membrane.

The following testing procedures were employed on samples which were prepared in accordance with the teachings of the present invention.

TEST PROCEDURES

Tensile Test

Tensile tests were carried out on an Instron Model 1122 tensile strength tester, in accordance with ASTM D 638-91. Machine parameters were set as follows:

Cross head speed (in/min): 0.423 cm/sec.

Full Scale load range (lbs): 222.4N

Humidity (%): 50

Temperature (deg F.): 22.8° C.

Grip Distance: 6.35 cm

Specimens were stamped out to conform with Type (II) of ASTM D638. The specimens had a width of 0.635 cm, and a gauge length of 2.54 cm.

Thickness

Thickness of the base material was determined with the use of a snap gauge (Johannes Kafer Co. Model No. F1000/302). Measurements were taken in at least four areas of each specimen. Thickness of the dried composite membrane was also obtained with the use of the snap gauge. Thicknesses of swollen samples were not measurable with the snap gauge due to the compression or residual water on the surface of the swollen membrane. Thickness measurements of the swollen membranes were also not able to be obtained with the use of scanning electron microscopy due to interferences with the swelling agents.

Moisture Vapor Transmission Rate (MVTR)

A potassium acetate solution, having a paste like consistency, was prepared from potassium acetate and distilled water. (Such a paste may be obtained by combining 230 g potassium acetate with 100 g of water, for example.) This solution was placed into a 133 ml. polypropylene cup, having an inside diameter of 6.5 cm. at its mouth. An expanded polytetrafluoroethylene (ePTFE) membrane was provided having a minimum MVTR of approximately 85,000 $g/m^2$–24 hr as tested by the method described in U.S. Pat. No. 4,862,730 to Crosby. The ePTFE was heat sealed to the lip of the cup to create a taut, leakproof, microporous barrier containing the solution.

A similar ePTFE membrane was mounted to the surface of a water bath. The water bath assembly was controlled at 23° C.±plus or minus 0.2° C., utilizing a temperature controlled room and a water circulating bath.

Prior to performing the MVTR test procedure, a sample to be tested was allowed to condition at a temperature of 23° C. and a relative humidity of 50%. The sample to be tested was placed directly on the ePTFE membrane mounted to the surface of the water bath and allowed to equilibrate for 15 minutes prior to the introduction of the cup assembly.

The cup assembly was weighed to the nearest 1/1000 g. and was placed in an inverted manner onto the center of the test sample.

Water transport was provided by a driving force defined by the difference in relative humidity existing between the water in the water bath and the saturated salt solution of the inverted cup assembly. The sample was tested for 10 minutes and the cup assembly was then removed and weighed again within 1/1000 g.

The MVTR of the sample was calculated from the weight gain of the cup assembly and was expressed in grams of water per square meter of sample surface area per 24 hours.

Peel Strength

Peel strength or membrane adhesion strength tests were conducted on membrane samples prepared with reinforced backings. Test samples were prepared having dimensions of 3 inches by 3.5 inches (7.62 cm×8.89 cm). Double coated vinyl tape (type—#419 available from the 3M Company of Saint Paul, Minn.) having a width of 1 inch (2.54 cm) was placed over the edges of a 4 inch by 4 inch (10.2 cm.×10.2 cm.) chrome steel plate so that tape covered all edges of the plate. The membrane sample was then mounted on top of the adhesive exposed side of the tape and pressure was applied so that sample was adhesively secured to the chrome plate.

The plate and sample were then installed, in a horizontal position, within an Instron tensile test machine Model No. 1000. An upper crosshead of the tensile test machine was lowered so that the jaws of the test machine closed flat and tightly upon the sample. The upper crosshead was then slowly raised pulling the membrane sample from the reinforced backing. When the membrane detached from the reinforced backing, the test was complete. Adhesion strength was estimated from the average strength needed to pull the membrane from the reinforced backing.

Ionic Conductance

The ionic conductance of the membrane was tested using a Palico 9100-2 type test system. This test system consisted of a bath of 1 molar sulfuric acid maintained at a constant temperature of 25° C. Submerged in the bath were four probes used for imposing current and measuring voltage by a standard "Kelvin" four-terminal measurement technique. A device capable of holding a separator, such as the sample membrane to be tested, was located between the probes. First, a square wave current signal was introduced into the bath, without a separator in place, and the resulting square wave voltage was measured. This provided an indication of the resistance of the acid bath. The sample membrane was then placed in the membrane-holding device, and a second square wave current signal was introduced into the bath. The resulting square wave voltage was measured between the probes. This was a measurement of the resistance due to the membrane and the bath. By subtracting this number from the first, the resistance due to the membrane alone was found.

Dimensional Stability

Reverse expansion in the x and y direction upon dehydration was measured using a type Thermomechanical Analyzer 2940, made by TA Instruments, Inc., of New Castle, Del. This instrument was used to apply a predetermined force to a sample that had been boiled in water for 30 minutes. A quartz probe placed in contact with the sample measured any linear changes in the sample as it dried. A sample was placed in a holder and then dried at 75° C. for greater than 10 min. The change in dimension (i.e., the shrinkage) was recorded as a percentage of the original weight.

Weight Loss With Temperature

A high resolution TGA 2950, Thermogravimetric Analyzer, made by TA Instruments (Newcastle, Del.) was used to determine the weight loss of samples with respect to temperature. This weight loss is an indication of the water content of the ionomer sample. Samples were heated at a rate of 10° C./min up to a temperature of 150° C., and the weight loss was recorded as a percentage of the original weight @100° C. as follows:

Selectivity

Two solutions of KCl, having concentrations of 1 molar and 0.5 molar, respectively, were separated using the membranes of the present invention. Two calomel reference electrodes (available from Fischer Scientific, Pittsburgh Pa., catalog number 13-620-52) were placed in each solution, and the potential difference across the membranes was recorded using a digital multimeter (available from Hewlett Packard, Englewood Calif., catalog number HP34401A). The values obtained correspond to the difference of chloride ion activity across the membrane and are reduced by the rate of anion migration across the membranes. Therefore the obtained values provide an indication of the membrane selectivity. The higher the measured voltage, the better the membrane selectivity.

Bubble Point Test

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The Bubble Point was measured according to the procedures of ASTM F316-86. Isopropyl alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

Pore Size and Pore Size Distribution

Pore size measurements are made by the Coulter Porometer™, manufactured by Coulter Electronics, Inc., Hialeah, Fla. The Coulter Porometer is an instrument that provides automated measurement of pore size distributions in porous media using the liquid displacement method (described in ASTM Standard E1298-89). The Porometer determines the pore size distribution of a sample by increasing air pressure on the sample and measuring the resulting flow. This distribution is a measure of the degree of uniformity of the membrane (i.e., a narrow distribution means there is little difference between the smallest and largest pore size). The Porometer also calculates the mean flow pore size. By definition, half of the fluid flow through the filter occurs through pores that are above or below this size. It is the mean flow pore size which is most often linked to other filter properties, such as retention of particulates in a liquid stream. The maximum pore size is often linked to the Bubble Point because bulk air flow is first seen through the largest pore.

Ball Burst Test

This text measures the relative strength of a sample by determining the maximum load at break. The sample is challenged with a 1 inch diameter ball while being clamped between two plates. The material is placed taut in the measuring device and pressure applied with the ball burst probe. Pressure at break is recorded.

Air Flow Data

The Gurley air flow test measures the time in seconds for 100 cc of air to flow through a one square inch sample at 4.88 inches of water pressure. The sample is measured in a Gurley Densometer (ASTM 0726-58). The sample is placed between the clamp plates. The cylinder is then dropped gently. The automatic timer (or stopwatch) is used to record the time (seconds) required for a specific volume recited above to be displaced by the cylinder. This time is the Gurley number.

The Frazier air flow test is similar but is mostly used for much thinner or open membranes. The test reports flow in cubic feet per minute per square foot of material at 0.5 inches water pressure. Air flow can also be measured with the Coulter Porometer. In this test, the operator can select any pressure over a wide range. The Porometer can also perform a pressure hold test that measures air flow during a decreasing pressure curve.

BACKGROUND OF EXAMPLES

As may be appreciated by one skilled in the art, the present invention provides for an ultra-thin, integral composite membrane having thicknesses which are significantly less than the thicknesses of conventional multilayer membranes. As a result, the membranes of the present invention provide lower electrical resistance. Also, because no porous surfaces are exposed in the present invention, there is no propensity for gasses to become trapped within the interior volume of the membrane thereby causing increased electrical resistance.

As described hereinabove, the ultra-thin integral composite membrane of the present invention can be advantageously employed in electrolytic processes and chemical separations. In a plate-and-frame type electrodialysis unit, the membrane of the present invention would take the place of existing cation exchange membranes. This membrane could be of the type which is laminated to a spacer screen in accordance with a specific application. Due to the higher conductance of this membrane, an electrodialysis unit could employ less membrane to achieve a given flux rate, thereby saving space and cost. If equipment is retro-fitted with this membrane, the voltage requirements would be reduced at a given current, or higher current could be run at a given voltage. Also, in a diffusion dialysis system, a given unit employing the membrane of the present invention would provide a higher flux.

A fuel cell, utilizing the membrane of the present invention, operates at a higher voltage for a given current density due to the improved ionic conductance of this membrane.

Also, due to improved water transport across the membrane, high limiting current may be achieved with less fuel gas humidification, as compared to membranes which have been employed heretofore. For example, the membrane of the present invention has a resistance of 0.044 ohm-sq cm. At a current density of 1 $A/cm^2$ this causes a voltage drop of about 44 mV, or about a 99 mV improvement in cell voltage compared to NAFION 117 membranes which have a resistance of 0.143 $\Omega$-$cm^3$. (NAFION is a registered trademark of E. I. DuPont de Nemours and Co., Inc.). As used herein, NAFION 117 means a membrane having a thickness of 7 mils made from perfluorosulfonic acid/tetrafluoroethylene (TFE)/copolymer. This may reduce losses by about 99 mW/sq cm at this operating condition for resistance. If the cell operating voltage increased from 500 mV to 599 mV, the cell voltage efficiency would increase from 41% to 49% of the theoretical 1.23 V. The decrease in the internal resistance of the cell allows the design of smaller or more efficient cells.

Without intending to limit the scope of the present invention, the apparatus and method of production of the present invention may be better understood by referring to the following examples. All samples of ePTFE provided in the following examples were made in accordance with the teachings of U.S. Pat. No. 3,593,566. More particularly, the ePTFE had the following material properties:

| | TYPE 1 | TYPE 2 |
|---|---|---|
| Thickness (mils) | 0.75–0.8 | 0.5 |
| Gurley (sec.) | 3.3 | 0.9 |
| Bubble Point (psi) | 28.3 | 32.6 |
| Mass/Area (g/m$^2$) | 6.1 | 4.4 |
| Density (g/cc) | 0.65 | 0.77 |
| Longitudinal Maximum Load (lbs.) | 1.76 | 2.18 |
| Transverse Maximum Load (lbs.) | 2.33 | 1.31 |

As may be appreciated by one skilled in the art, ePTFE membranes having a thickness of less than 0.025 mm may be produced with a wide range of physical property values. The physical property value ranges far exceed the two examples given above.

Example 1

A TYPE 1 ePTFE membrane, having a nominal thickness of 0.75 mils (0.02 mm), was mounted on a 6 inch wooden embroidery hoop. An ion exchange material/surfactant solution was prepared comprising 95% by volume of a perfluorosulfonic acid/tetrafluoroethylene copolymer resin solution (in H+ form which itself is comprised of 5% perfluorosulfonic acid/tetrafluoroethylene copolymer resin, 45% water, and 50% a mixture of low molecular weight alcohols, commercially available from E. I. DuPont de Nemours, Inc. under the registered trademark NAFION® type NR-50 (1100 EW) hereinafter "NR-50") and 5% of a nonionic surfactant of octyl phenoxy poly ethoxyethanol (Triton X-100, commercially available from Rohm & Haas of Philadelphia, Pa.). This solution was brushed on both sides of the membrane to impregnate and substantially occlude the interior volume of the membrane. The sample was then dried in the oven at 140° C. for 30 seconds. The procedure was repeated two more times to fully occlude the interior volume. The sample was then soaked in isopropanol for 5 minutes to remove the surfactant. After rinsing with distilled water and allowing the sample to dry at room temperature, a final coat of the ion exchange material/surfactant solution was applied. The wet membrane was again dried in the oven at 140° C. for 30 seconds and soaked in isopropanol for 2 minutes. The membrane was finally boiled in distilled water for 30 minutes under atmospheric pressure to swell the treated membrane. Gurley numbers for this material are summarized in Table 3. Ionic conductive rates are summarized in Table 4. The tensile strength may be found in Table 2. Percent weight change of this sample may be found in Table 6. The swollen membrane was later dried to a dehydrated state in an oven at 140° C. for 30 seconds. The thickness of the dried composite membrane was measured and found to be approximately the same thickness as the base material.

Example 2

A TYPE 1 ePTFE membrane, having a nominal thickness of 0.75 mils (0.02 mm) and a Gurley Densometer air flow of 2–4 seconds, was placed on top of a netting of polypropylene obtained from Conwed Plastics Corp. of Minneapolis, Minn. The two materials were bonded together on a laminator with 10 psig pressure, a speed of 15 feet per minute and a temperature of 200° C. No adhesives were used. The reinforced membrane sample was then placed on a 6 inch wooden embroidery hoop. A solution was prepared of 96% by volume of a perfluorosulfonic acid/TFE copolymer resin in alcohol, and 4% of the nonionic surfactant Triton X-100. This solution was brushed only on the membrane side to substantially occlude the interior volume of the membrane. The sample was dried in an oven at 130° C. This procedure was repeated three more times to fully occlude the interior volume of the membrane. The sample was then baked in an oven at 140° C. for 5 minutes. The sample was soaked in isopropanol for 5 minutes to remove the surfactant. The membrane was then boiled in distilled water for 30 minutes under atmospheric pressure causing the treated membrane to swell. Gurley numbers for this material are summarized in Table 3.

This sample was tested for its peel strength in accordance with the method described above. The linear bond strength was found to be 2.06 lb./sq. in. (1450 kg/m$^2$).

Example 3

A TYPE 2 ePTFE membrane, having a thickness of 0.5 mils (0.01 mm), was mounted on a 6 inch wooden embroidery hoop. A solution of 100% by volume of NR-50 was brushed onto both sides of the membrane, without the addition of any surfactants, to substantially occlude the interior volume of the membrane. The sample was then placed in an oven at 140° C. to dry. This procedure was repeated four more times until the membrane was completely transparent and the interior volume of the membrane was fully occluded. The sample was then boiled in distilled water for 30 minutes at atmospheric pressure causing the membrane to swell. Gurley numbers for this material are summarized in Table 3.

Example 4

A TYPE 2 ePTFE membrane, having a thickness of 0.5 mils (0.01 mm), was mounted onto a 6 inch wooden embroidery hoop. A solution was prepared of 95% by volume NR-50 and 5% of the nonionic surfactant, Triton X-100. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the solution was applied. The wet membrane was dried in the oven at 140° C. for 30 seconds, and then soaked in isopropanol for 2 minutes. Finally, the membrane was boiled in distilled water for 5 minutes. Moisture vapor transmission rates for the treated membrane were measured and are summarized in Table 1. The Gurley number of the treated membrane is summarized in Table 3.

Example 5

A TYPE 1 ePTFE membrane, having a nominal thickness of 0.75 mils (0.02 mm), was mounted onto a 6 inch wooden embroidery hoop. The Gurley Densometer air flow for this membrane was 2–4 seconds. A solution was prepared of 95% by volume NR-50 and 5% Triton X-100. The solution was brushed on both sides of the membrane with a foam brush and the excess was wiped off. The wet membrane was dried in the oven at 140° C. for 30 seconds. Three additional coats of solution were applied in the same manner. The membrane was then soaked in isopropanol for 2 minutes. After rinsing with distilled water and allowing to dry at room temperature, a final coat of the solution was applied. The wet membrane was dried in the oven at 140° C. for 30 seconds, then soaked in isopropanol for 2 minutes. This material was not boiled. No swelling other than the minor swelling during the surfactant removal occurred. The ionic conduction rate for this material is presented in Table 4.

Example 6

A TYPE 1 ePTFE membrane, having a nominal thickness of 0.75 mils (0.02 mm), was mounted onto a 5 inch plastic embroidery hoop. The Gurley Densometer air flow for this membrane was 2–4 seconds. A solution was prepared of 95% NR-50 and 5% Triton X-100. The solution was brushed on both sides of the membrane with a foam brush and the excess was wiped off. The wet membrane was dried in the oven at 140° C. for 30 seconds. Two additional coats of solution were applied in the same manner to fully occlude the interior volume of the membrane. The membrane was then soaked in isopropanol for 2 minutes. After rinsing with distilled water and allowing to dry at room temperature, a final coat of the solution was applied. The wet membrane was dried in the oven at 140° C. for 30 seconds, and then soaked in isopropanol for 2 minutes to remove the surfactant. The sample was rinsed and dried at room temperature.

This sample was weighed before it was mounted on the 5 inch plastic hoop. Following treatment, it was removed from the hoop and weighed again. The ion exchange polymer content was directly calculated by determining the weight change before and after treatment. The ion exchange content for this sample was found to be 98.4 mg or 7.77 grams per square meter of membrane.

Example 7

A TYPE 1 ePTFE membrane, having a nominal thickness of 0.75 mils (0.02 mm) and a Gurley Densometer air flow of 2–4 seconds, was placed on top of a netting of polypropylene which was obtained from Applied Extrusion Technologies, Inc. of Middleton, Del. The two materials were bonded together on a laminator with 10 psig pressure, a speed of 15 feet per minute and a temperature of 200° C. The reinforced sample was then mounted on a 6 inch diameter wooden embroidery hoop. A solution was prepared consisting of the following: 1) 95% by volume NR-50, containing 5% by weight perfluorosulfonic acid/TFE copolymer resin in a solvent mixture of less than 25% water, preferably 16–18% water, and the remainder a mixture of isopropanol and normal propanol; and 5% of Triton X-100 non-ionic surfactant. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the ion exchange material/surfactant solution was applied. The wet membrane was dried in the oven at 140° C. for 30 seconds, then soaked in isopropanol for 2 minutes. Finally, the membrane was boiled in distilled water for 5 minutes.

Example 8

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution was prepared consisting of the following: 1) 95% NR-50, containing 5% by weight perfluorosulfonic acid/TFE copolymer resin in a solvent mixture of less than 25% water, preferably 16–18% water, and the remainder a mixture being isopropanol and normal propanol; and 5% of Triton X-100 non-ionic surfactant. The solution was brushed on both sides of the membrane with a foam brush and the excess was wiped off. The wet membrane was dried in an oven at 140° C. for 30 seconds. Three additional coats of solution were applied to the membrane in the same manner. The membrane was then soaked in isopropanol for 2 minutes to remove the surfactant. The membrane was rinsed with distilled water and allowed to dry at room temperature. A final treatment of the solution was applied. The wet membrane was dried in the oven at 140° C. for 30 seconds, then soaked in isopropanol for 2 minutes. Finally, the membrane was boiled in distilled water for 5 minutes.

Example 9

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. The membrane was first submerged in a solution consisting of 25% Triton X-100 non-ionic surfactant, 25% water, and 50% isopropyl alcohol. Next, a solution of NR-50 was brushed on both sides of the membrane with a foam brush and the excess was wiped off. The wet membrane was dried in an oven at 140° C. for 30 seconds. Three additional coats of surfactant solution followed by a coat of NR-50 solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the ion exchange material/surfactant was applied to the membrane. The wet membrane was dried in the oven at 140° C. for 30 seconds, then soaked in isopropanol for 2 minutes. Finally, the membrane was boiled in distilled water for 5 minutes.

Example 10

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. The membrane was first submerged in a solution consisting of 25% Triton X-100 non-ionic surfactant, 25% water, and 50% isopropyl alcohol. Next, a 95% by weight NR-50 solution, containing 5% by weight perfluorosulfonic acid/TFE copolymer resin in a solvent mixture of less than 25% water, preferably 16–18% water, and the remainder a mixture of isopropanol and normal propanol, was brushed on both sides of the membrane with a foam brush and the excess was wiped off. The wet membrane was dried in an oven at 140° C. for 30 seconds. Three additional coats of surfactant solution followed by the NR-50 solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the NR-50 solution was applied. The wet membrane was dried in the oven at 140° C. for 30 seconds, then soaked in isopropanol for 2 minutes. Finally, the membrane was boiled in distilled water for 5 minutes.

Example 11

A TYPE 1 ePTFE membrane, having a nominal thickness of 0.75 mils (0.02 mm) and a Gurley Densometer air flow of 2–4 seconds, was placed on top of a netting of polypropylene. The two materials were bonded together on a laminator with 10 psig pressure, a speed of 15 feet per minute and a temperature of 200° C. The reinforced sample was then mounted on a 6 inch diameter wooden embroidery hoop. The membrane was first submerged in a solution consisting of 25% Triton X-100 non-ionic surfactant, 25% water, and 50% isopropyl alcohol. Next, a solution of NR-50 was brushed on both sides of the membrane with a foam brush and the excess was wiped off. The wet membrane was dried in an oven at 140° C. for 30 seconds. Three additional coats of the surfactant solution followed by the NR-50 solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the NR-50 solution was applied. The wet membrane was dried in the oven at 140° C. for 30 seconds, then soaked in isopropanol for 2 minutes. Finally, the membrane was boiled in distilled water for 5 minutes.

Example 12

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acids copolymer resin in a solvent mixture of less than 25% water, preferably 16–18% water, and the remainder a mixture of isopropanol and normal propanol was allowed to evaporate slowly at room temperature. The resulting resin was ground to a powder with a mortar and pestle. This resin was then dissolved in methanol under low heat (less than 70° C.). The final solution contained the original resin content in a base solvent of methanol such that the resin content of the solution was 5% by weight. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was boiled in distilled water for 5 minutes.

Example 13

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin, in a solvent mixture of less than 25% water, preferably 16–18% water, and the remainder a mixture of isopropanol and normal propanol, was allowed to evaporate slowly at room temperature. The resulting resin was ground to a powder with a mortar and pestle. This resin was then dissolved in methanol under low heat (less than 70° C.). The final solution contained the original resin content in a base solvent of methanol such that the resin content of the solution was 5% by weight. This solution was used to prepare a new solution comprised of a 95% dewatered resin solution, and 5% Triton X-100 non-ionic surfactant. The solution was brushed on both sides of the membrane with a foam brush and the excess was wiped off. The wet membrane was dried in an oven at 140° C. for 30 seconds. Two additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the resin/Triton X-100 non-ionic surfactant solution was applied. The wet membrane was dried in the oven at 140° C. for 30 seconds, then soaked in isopropanol for 2 minutes. Finally, the membrane was boiled in distilled water for 5 minutes.

Example 14

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin in a solvent mixture of less than 25% water, preferably 16–18% water, and the remainder a mixture of isopropanol and normal propanol, was allowed to partially evaporate slowly at room temperature. Before all the solvent evaporated, the viscous liquid was mixed with methanol. The water content of the resulting solution was estimated at 5%. The resin content of the solution was 5%. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was boiled in distilled water for 5 minutes.

Example 15

A TYPE 1 ePTFE membrane, having a nominal thickness of 0.75 mils (0.02 mm) and a Gurley Densometer air flow of 2–4 seconds, was placed on top of a netting of polypropylene. The two materials were bonded together on a laminator with 10 psig pressure, a speed of 15 feet per minute and a temperature of 200° C. The reinforced sample was then mounted on a 6 inch diameter wooden embroidery hoop. A solution consisting of 5% by weight of perfluorosulfonic acid/TFE copolymer resin in a solvent mixture of less than 25% water, preferably 16–18% water and the remainder a mixture of isopropanol and normal propanol, was allowed to partially evaporate slowly at room temperature. Before all the solvent evaporated, the viscous liquid was mixed with methanol. The water content of the resulting solution was estimated at 5%. The resin content of the solution was 5%. The solution was brushed on both sides of the membrane with a foam brush and the excess was wiped off. The wet membrane was dried in an oven at 140° C. for 30 seconds. Three additional coats of solution were applied to the membrane in the same manner to fully occlude the interior volume of the membrane. The membrane was boiled in distilled water for 5 minutes.

Example 16

A TYPE 1 ePTFE membrane, having a nominal thickness of 0.75 mils (0.02 mm) and a Gurley Densometer air flow of 2–4 seconds, was mounted on a 6 inch diameter wooden embroidery hoop. A solution consisting of 5% by weight of perfluorosulfonic acid/TFE copolymer resin in a solvent mixture of less than 25% water, preferably 16–18% water and the remainder a mixture of isopropanol and normal propanol, was allowed to partially evaporate slowly at room temperature. Before all the solvent evaporated, the viscous liquid was mixed with methanol. The water content of the resulting solution was estimated at 5%. The resin content of the solution was 5%. This solution was used to prepare a new solution comprised of 95% of the low-water resin solution, and 5% of the nonionic surfactant, Triton X-100. The new solution was brushed on both sides of the membrane with a foam brush and the excess was wiped off. The wet membrane was dried in an oven at 140° C. for 30 seconds. Two additional coats of solution were applied to the membrane in the same manner to fully occlude the interior volume of the membrane. The membrane was then soaked in isopropanol for 2 minutes to remove the surfactant. The membrane was rinsed with distilled water and allowed to dry at room temperature. A final treatment of the new solution was applied. The wet membrane was dried in the oven at 140° C. for 30 seconds, then soaked in isopropanol for 2 minutes. Finally, the membrane was boiled in distilled water for 5 minutes.

Example 17

A thermoplastic frame was cut and a membrane of ePTFE was placed at a center location of the frame. The ePTFE membrane was heat sealed to the frame. The membrane was then treated in accordance with Example 1. Alternatively, a fluoroionomer membrane made in accordance with Example 1 was secured mechanically within a frame.

This "framed" fluoroionomer composite has utility, by providing a unitary construction which can be placed in a device, which beyond serving as an ion exchange medium, can also serve as a sealant between various components of a cell assembly.

Example 18

TEFLON® fine powder was blended with ISOPAR K mineral spirit at a rate of 115 cc per pound of fine powder. The lubricated powder was compressed into a cylinder and was ram extruded at 70° C. to provide a tape. The tape was split into two rolls, layered together and compressed between rolls to a thickness of 0.030 inch. Next, the tape was stretched transversely to 2.6 times its original width. The ISOPAR K was driven off by heating to 210° C. The dry tape was expanded longitudinally between banks of rolls in a heat zone heated to 300° C. The ratio of speed of the second bank of rolls to the first bank of rolls was 35:1 and the third bank of rolls to the second bank of rolls was 1.5:1, for a total of 52:1 longitudinal expansion producing a tape having a width of 3.5 inches. This tape was heated to 295° C. and transversely expanded 13.7 times in width, while being constrained from shrinkage and then heated to 365° C. while still constrained. This process produced a web-like membrane having a porous microstructure composed substantially of fibrils in which no nodes were present.

Comparative Samples

NAFION 117, a perfluorosulfonic acid/tetrafluoroethylene(TFE)/copolymer cation exchange membrane, unreinforced film of 1100 equivalent weight commercially available from E. I. DuPont de Nemours Co., Inc., having a quoted nominal thickness of 7 mils (0.18 mm) was obtained. The samples, originally in the hydrated swollen state, were measured in the x- and y-directions and weighed.

Without intending to limit the scope of the present invention, data collected from testing the ion exchange membranes made in accordance with the procedures of the foregoing examples are summarized in the following tables. As may be appreciated by one skilled in the art, these tables reveal that the ion exchange membrane of this invention has superior ionic conductance and exceptional dimensional stability compared to known ion exchange membranes. Furthermore, this inventive membrane has good mechanical strength in the unswollen state and retains much of its mechanical strength in the swollen state, whereas conventional membranes are substantially weakened upon hydration.

TABLE 1

Moisture Vapor Transmission Rates (MVTR)

| Sample ID* | MVTR (grams/m$^2$-24 hrs.) |
|---|---|
| 4 | 25,040 |
| NAFION 117 | 23,608 |

*Measurements were obtained on samples in their swollen state.

TABLE 2

Tensile Test

| Sample ID | (Avg) Normalized Stress @ Max Load (psi) | |
|---|---|---|
| | M-Dir | XM-Dir |
| Example 1 | 4706 | 2571 |
| NAFION 117* | 2308 | 1572 |
| Example 6 | 4988 | 3463 |
| NAFION 117** | 4314 | 3581 |

*sample was boiled in distilled water for 30 minutes.
**sample was tested as received from E. I. DuPont de Nemours, Inc.

TABLE 3

Gurley Numbers

| Sample ID | Thickness (mm)* | Base Material Gurley No. (sec) | Final Swollen Membrane Gurley Number (sec) |
|---|---|---|---|
| 1 | 0.02 | 2–4 | Total occlusion |
| 2 | 0.02 | 2–4 | Total occlusion |
| 3 | 0.01 | 2–4 | Total occlusion |

*Thickness measurements were obtained on samples prior to swelling in dried state.

TABLE 4

Ionic Conductance

| Sample ID | Ionic Conductance (mhos/sq. cm) |
|---|---|
| Example 1 | 22.7 |
| NAFION 117* | 7.0 |
| Example 5 | 8.5 |
| NAFION 117** | 4.7 |

*sample was boiled in distilled water for 30 minutes.
**sample was tested as received from E. I. DuPont de Nemours, Inc.

TABLE 5

Weight Loss With Temperature

| Sample ID | Final Weight (% of Orig. Wt.) @ 100° C.) |
|---|---|
| Example 1 | 72 |
| NAFION 17* | 75 |
| Example 6 | 98 |
| NAFION 117** | 98 |

*sample was boiled in distilled water for 30 minutes.
**sample was tested as received from E. I. DuPont de Nemours, Inc.

TABLE 6

Selectivity

| Sample ID | Selectivity (millivolts) |
|---|---|
| NAFION 117, dry | 16.3 |
| NAFION 117, boiled | 10.8 |
| Example 1, boiled | 3.8 |
| Example 2, dry | 15.7 |

TABLE 7

| | Transverse Direction | Machine Direction |
|---|---|---|
| Example 1 | 2.95% | 2.90% |
| NAFION 117 | 11.80% | 10.55% |

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

We claim:

1. An ultra-thin composite membrane comprising:

(a) an expanded polytetrafluoroethylene membrane having a porous microstructure of polymeric fibrils and a total thickness of less than [0.025 mm] *0.8 mils*; and (b) an ion exchange material impregnated throughout the membrane, the impregnated expanded polytetrafluoroethylene membrane having a Gurley number of greater than 10,000 seconds, wherein the ion exchange material substantially impregnates the membrane to render an interior volume of the membrane substantially occlusive.

2. The ultra-thin composite membrane of claim 1, and wherein the membrane comprises a microstructure of nodes interconnected by fibrils.

3. The ultra-thin composite membrane of claim 1, and wherein the ion exchange material is selected from a group consisting of perfluorinated sulfonic acid resin, perfluorinated carboxylic acid resin, polyvinyl alcohol, divinyl benzene, styrene-based polymers, and metal salts with or without a polymer.

4. The ultra-thin composite membrane of claim 1, and wherein the ion exchange material is a perfluorosulfonic acid/tetrafluoroethylene copolymer resin dissolved in a solvent solution selected from a group consisting of water, ethanol, propanol, butanol, methanol, and combinations thereof.

5. The ultra-thin composite membrane of claim 1, further comprising a reinforcement backing bonded to the membrane wherein the reinforcement backing is selected from a group consisting of woven and nonwoven materials.

6. The ultra-thin composite membrane of claim 5, and wherein the woven materials are selected from the group consisting of: weaves of expanded porous polytetrafluoroethylene fibers, webs of polypropylene, and netting of polypropylene.

7. The ultra-thin composite membrane of claim 5, and wherein the nonwoven material is spun-bonded polypropylene.

8. An ultra-thin composite membrane comprising:

(a) a membrane having a porous microstructure *of polymeric fibrils* and a total thickness of less than [13 μm] *0.51 mils*; and (b) an ion exchange material impregnated throughout the membrane, the impregnated expanded polytetrafluoroethylene membrane having a Gurley number of greater than 10,000 seconds, wherein the ion exchange material substantially impregnates the membrane to render an interior volume of the membrane substantially occlusive.

9. The ultra-thin composite membrane of claim 8, and wherein the membrane is expanded polytetrafluoroethylene.

10. The ultra-thin composite membrane of claim 8, and wherein the ion exchange material is selected from a group consisting of perfluorinated sulfonic acid resin, perfluorinated carboxylic acid resin, polyvinyl alcohol, divinyl benzene, styrene-based polymers, and metal salts with or without a polymer.

11. The ultra-thin composite membrane of claim 8, and wherein the ion exchange material is a perfluorosulfonic acid/tetrafluoroethylene copolymer resin dissolved in a solvent solution selected from a group consisting of water, ethanol, propanol, butanol, methanol and combinations thereof.

12. The ultra-thin composite membrane of claim 8, further comprising a reinforcement backing bonded to the membrane wherein the reinforcement backing is selected from a group consisting of woven and nonwoven materials.

13. The ultra-thin composite membrane of claim 12, and wherein the woven materials are selected from a group consisting of: weaves of expanded porous polytetrafluoroethylene fibers, webs of polypropylene, and netting of polypropylene.

14. The ultra-thin composite membrane of claim 12, and wherein the nonwoven material is spun-bonded polypropylene.

15. An ion exchange membrane comprising:

(a) a membrane comprising an expanded polytetrafluoroethylene having a porous microstructure defined substantially of only fibrils; and (b) an ion exchange material impregnated throughout the membrane, the impregnated expanded polytetrafluoroethylene membrane having a Gurley number of greater than 10,000 seconds, wherein the ion exchange material substantially impregnates the membrane to render an interior volume of the membrane substantially occlusive*, said membrane having a total thickness within the range of between 0.06 mils and about 0.5 mils*.

16. The ion exchange membrane of claim 15 wherein the porous microstructure of the membrane defines pores having an average size of from about 0.05 to about 0.4 μm.

17. The ion exchange membrane of claim 16, and wherein the average pore size is less than 0.2 μm.

[18. The ion exchange membrane of claim 16, and wherein the total thickness of the membrane is less 13 μm.]

[19. The ion exchange membrane of claim 18 and wherein the total thickness of the membrane is from about 1.32 μm to about 12.7 μm.]

20. The ion exchange membrane of claim 15, and wherein the ion exchange material is selected from a group consisting of polyfluorinated sulfonic acid resin, perfluorinated carboxylic acid resin, polyvinyl alcohol, divinyl benzene, styrene-based polymers, and metal salts with or without a polymer.

21. The ion exchange membrane of claim 15, and wherein the ion exchange material is a perfluorosulfonic acid/tetrafluoroethylene copolymer resin dissolved in a solvent solution selected from a group including water, ethanol, propanol, butanol, methanol, and combinations thereof.

22. The ion exchange membrane of claim 15, further comprising a reinforcement backing bonded to the porous polymeric membrane, wherein the reinforcement backing is selected from a group consisting of woven and nonwoven materials.

23. The ion exchange membrane of claim 22, and wherein the woven materials are selected from a group consisting of: weaves of expanded porous polytetrafluoroethylene fibers, webs of polypropylene, and netting of polypropylene.

24. The ion exchange membrane of claim 22, and wherein the nonwoven material is spun-bonded polyproyplene.

*25. A composite, ultra-thin, substantially non-porous membrane consisting essentially of:*

*(a) a polytetrafluoroethylene base having a pore structure defined by at least fibrils, said pore structure defining a porosity of at least 70% within said base; and*

*(b) an ion exchange resin contained within said pore structure and substantially filling said pore structure, such that the composite membrane has a Gurley number which exceeds 10,000 seconds, said composite membrane having a thickness no greater than 0.8 mils.*

*26. The composite membrane of claim 25, wherein said pore structure is defined by nods interconnected with said fibrils.*

*27. The composite membrane of claim 25, wherein said composite membrane has a thickness between the range of about 0.06 and 0.8 mils.*

*28. The composite membrane of claim 25, wherein said composite membrane has a thickness between the range of 0.3 and about 0.5 mils.*

*29. The composite membrane of claim 25, wherein said composite membrane has a thickness of not more than about 0.5 mils.*

*30. The composite membrane of claim 25, wherein said ion exchange resin is a mixture of ion exchange resins.*

*31. The composite membrane of claim 25, wherein said ion exchange resin is a perfluorinated sulfonic acid resin.*

*32. A composite, substantially non-porous membrane consisting essentially of:*

*(a) a polytetrafluoroethylene base having a pore structure defined by at least fibrils, said pore structure defining a porosity of at least 70% within said base; and*

*(b) an ion exchange resin contained within said pore structure and substantially filling said pore structure, such that the composite membrane has a Gurley number which exceeds 10,000 seconds, said composite membrane having a thickness of at most 0.8 mils and an ionic conductance of at least 8.5 mhos/cm$^2$.*

*33. The composite membrane of claim 32, which has a thickness between the range of about 0.06 and 0.8 mils.*

*34. The composite membrane of claim 32, which has a thickness between the range of about 0.5 and 0.8 mils.*

*35. The composite membrane of claim 32, which has a thickness at most about 0.5 mils.*

*36. The composite membrane of claim 32, where said ion exchange resin is a perfluorosulfonic acid/tetrafluoroethylene copolymer resin.*

*37. A supported, composite membrane consisting essentially of:*

*(a) a porous support material; and*

*(b) a composite, ultra-thin, substantially non-porous membrane, said composite membrane having a polytetrafluoroethylene base having a pore network formed by at least fibrils, said pore network defining a porosity of at least 70% within said base; and*

*(c) an ion exchange resin contained within said pore network and substantially filling said pore network, such that the composite membrane has a Gurley number which exceeds 10,000 seconds and said composite membrane has a thickness no greater than 0.8 mils.*

*38. The supported composite membrane of claim 37, wherein said pore network is formed by nodes interconnected with said fibrils.*

*39. The composite membrane of claim 31, wherein said composite membrane which has a thickness between the range of about 0.06 and 0.8 mils.*

*40. The composite membrane of claim 37, wherein said composite membrane which has a thickness between the range of about 0.5 and 0.8 mils.*

*41. The composite membrane of claim 37, wherein said composite membrane which has a thickness of at most about 0.5 mils.*

*42. The composite membrane of claim 37, wherein said ion exchange resin is a perfluorinated sulfonic acid resin.*

*43. The composite membrane of claim 37, where said ion exchange resin is a mixture of ion exchange resins.*

*44. A composite, ultra-thin, substantially non-porous membrane having a total thickness of at most 0.8 mils having a polytetrafluoroethylene base with a pore structure defining a porosity of at least 70% within said base, at least one ion exchange resin contained within said pore structure such that said composite membrane has a Gurley number which exceeds 10,000 seconds, and is prepared by the process comprising the steps of:*

*(a) providing a polytetrafluoroethylene membrane having polytetrafluoroethylene base and a thickness of at most 0.8 mils and having a pore structure defining a porosity of at least 70% within said base; and*

*(b) applying an ion exchange resin containing solution to each side of said polytetrafluoroethylene base to substantially fill said pore structure.*

*45. The composite membrane of claim 44, wherein said process further comprises:*

*(c) repeating step (b) until said ion exchange resin substantially fills said pore structure.*

*46. The composite membrane of claim 44, wherein said composite membrane has a thickness in the range of between about 0.06 and 0.8 mils.*

*47. The composite membrane of claim 44, wherein said composite membrane has a thickness in the range between about 0.5 to 0.8 mils.*

*48. The composite membrane of claim 44, wherein said step (b) is repeated at least two times.*

*49. The composite membrane of claim 44, wherein said step (b) is repeated at least three times.*

*50. The composite membrane of claim 44, wherein step (b) further comprises:*

*(i) first applying said ion exchange resin containing solution to a first side of said polytetrafluoroethylene base and then evaporating solvent in said solution; and*

*(ii) thereafter, applying said ion exchange resin containing solution to a second side of said polytetrafluoroethylene base and then evaporating solvent in said solution.*

*51. The composite membrane of claim 50, wherein said process further includes the step of:*

*(c) heating said polytetrafluoroethylene base containing ion exchange resin within said pore structure.*

* * * * *